Dec. 14, 1954    L. C. BRUNSTRUM ET AL    2,696,734
VISCOMETER FOR SEMIFLUID SUBSTANCES
Filed May 3, 1950    2 Sheets-Sheet 1
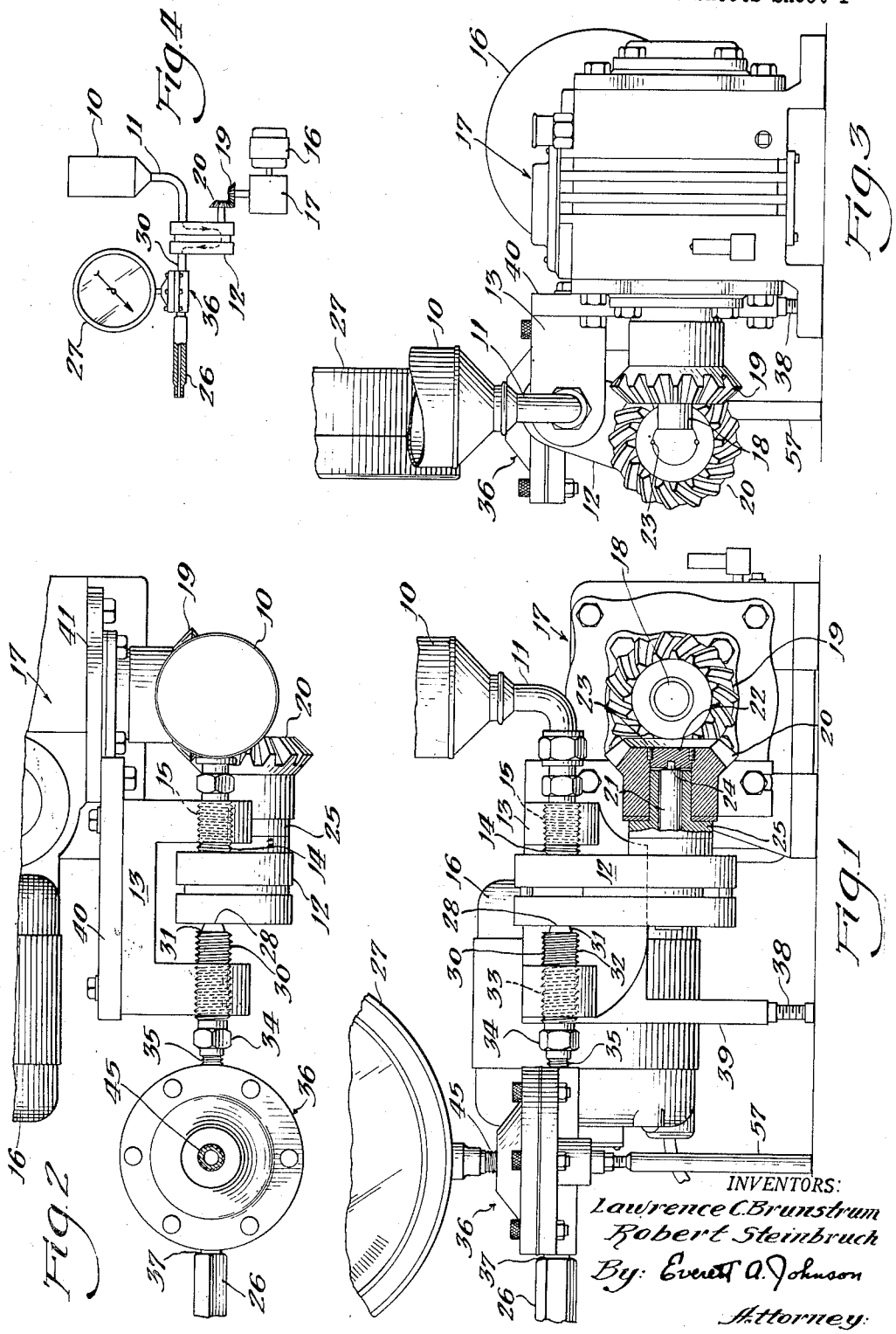
INVENTORS:
Lawrence C. Brunstrum
Robert Steinbruch
By: Everett A. Johnson
Attorney Dec. 14, 1954     L. C. BRUNSTRUM ET AL     2,696,734
VISCOMETER FOR SEMIFLUID SUBSTANCES
Filed May 3, 1950
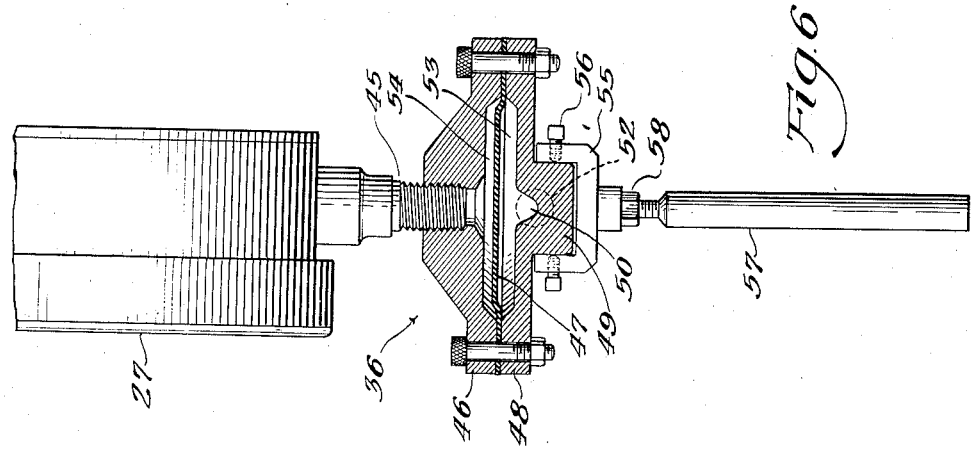
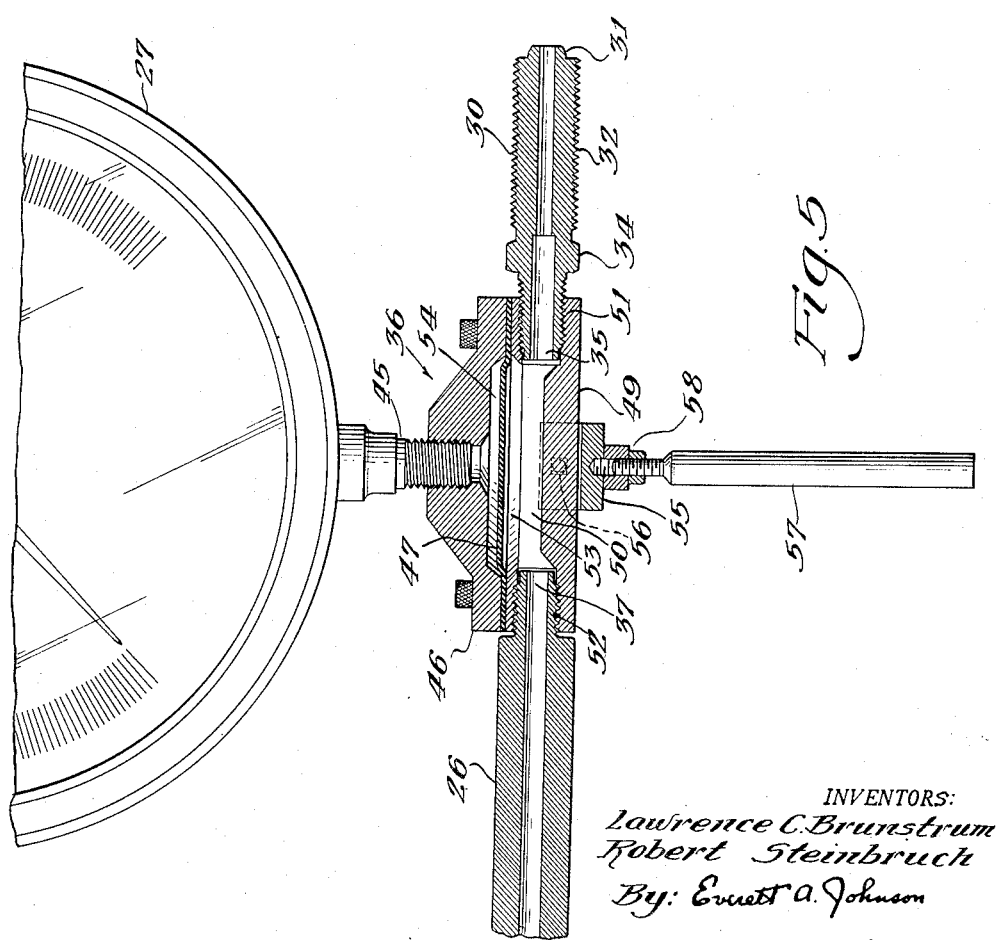
INVENTORS:
Lawrence C. Brunstrum
Robert Steinbruch
By: Everett A. Johnson
Attorney

United States Patent Office 2,696,734
Patented Dec. 14, 1954

2,696,734

VISCOMETER FOR SEMIFLUID SUBSTANCES

Lawrence C. Brunstrum, Flossmoor, Ill., and Robert Steinbruch, Hammond, Ind., assignors to Standard Oil Company, Chicago, Ill., a corporation of Indiana Application May 3, 1950, Serial No. 159,818

3 Claims. (Cl. 73—55)

This invention relates to a novel pressure viscometer, and more particularly relates to a device for indicating viscosities in the routine inspection of semi-fluid greases and the like.

There are well-established methods of evaluating flow characteristics for solid and fluid lubricants. However, for the routine testing of semi-fluid greases softer than Number 1 grade there exists no generally adaptable instrument which can be considered equivalent to speed and simplicity of operation to the cone penetrometer as applied to heavier greases or to the viscometer for truly fluid lubricants.

Heretofore it has been proposed to measure the apparent viscosity of plastic substances by determining the pressure drop when the substance is forced through a capillary of known characteristics at a predetermined shear rate. However, the prior devices and systems have been cumbersome and inaccurate for short term multi-sample operations. Such apparatus include a fluid conduit of considerable length between the pressure indicating means and the inlet of the capillary and since the plastic substances are of poor viscosity index, the results were seriously affected by temperature changes and differentials. Accordingly, it was necessary to provide constant temperature baths for immersing all portions of the system which contained the plastic material under test. Also, the nature of the plastic substances is such as to cause fouling and caking of the pressure tap or take-off between tests with the result that misleading and inaccurate values were obtained on subsequent samples.

In an attempt to overcome these difficulties, a stopcock or valve had been proposed for use in the line between the pressure take-off and the pressure gauge with a hydraulic liquid above the stopcock. However, the hydraulic oil in the pressure measuring system would leak into the grease chamber during test with the result that a contaminated sample was passed through the capillary. Also, the test procedure in systems employing the stopcock or valve was complicated and time-consuming. Still another disadvantage of prior systems of this general type is that it was not possible to attain an equilibrium pressure quickly. Likewise, the pressure drop within the system, exclusive of the pressure drop across the capillary, was frequently so great as to give confused and inaccurate readings.

It is therefore a principal object of our invention to provide a method and means for convenient and routine viscosity inspection of semi-fluid materials. A further object is to provide an apparatus which is particularly adapted for the testing of a multiplicity of samples or batches in succession. Another object of our invention is to provide a compact and unitary device which is readily portable and which can be operated without maintaining it within a separate constant temperature bath. It is also an object of our invention to provide a system for testing semi-fluid materials which gives values that are readily comparable with measurements on stiff and truly fluid materials.

A further object is to provide an apparatus which has no recorded pressure drop when the capillary is absent. Still another object of the invention is to provide a device wherein the viscosity of an uncontaminated sample is measured.

An additional object of our invention is to provide an apparatus and test procedure in conjunction with such apparatus which is adapted to make tests quickly and to make unnecessary the interruption of the testing of samples by a separate purging operation. Still another object is to provide an arrangement of elements wherein the residence time of the sample under pressure is held to a minimum and where the smallest possible flow area is provided without encountering an indicated pressure drop which masks the reading attributable to the standard capillary. These and other objects of the invention will become apparent as the description of our invention proceeds.

By our invention a system is provided for determining the viscosity of semi-fluid materials such as hydrocarbon greases and gels as a direct function of the pressure which builds up at the inlet of a capillary tube. A conversion factor for the apparatus is selected and the value of this factor may be changed by varying the flow rate or the capillary size. A positive displacement pump operating at constant speed is used and the pressure produced is a direct measurement of the viscosity of the semi-fluid. In other words, at a predetermined rate of shear, the measured pressure is proportional to the viscosity of the semi-fluid material.

More specifically, we attain the objects of our invention by providing an arrangement wherein no pressure drop occurs between the capillary and a diaphragm pressure gauge assembly. The gauge assembly includes a pair of oppositely disposed flanged members having a diaphragm between the flanges to form two cavities. A hydraulic oil is disposed in one cavity on one side of the diaphragm and communicates by means of a suitable conduit with the pressure gauge. The plastic material under test is pumped through the test cavity below the diaphragm and into the capillary, which creates the pressure drop, tending to deflect the diaphragm. This deflection is transmitted by the hydraulic fluid in the other cavity to the pressure gauge. In the test cavity a streamlined channel is provided along the base but the entire surface of the diaphragm is exposed to the flowing semi-fluid material.

Thus, it will be seen that the capillary in our invention is in direct communication with a test cavity containing the pressure responsive diaphragm. Accordingly, the test zone is of such limited extent that the ambient temperature is readily attained by the entire assembly. For this reason it is unnecessary to provide special localized temperature control in the apparatus, and a simplified and readily portable device results. Further, the instrument is characterized by having a low residence time. Substantially no pressure drop occurs between the capillary and the diaphragm assembly and the equilibrium pressure is quickly attained. All of these factors result in a device of improved pressure response and avoids any appreciable change in the consistency of the semi-fluid material due to "working" within the apparatus. Thus our device is particularly adapted for repeated spot or control tests, which give results that are directly comparable to those obtained by the proposed method of test for apparent viscosity of lubricating greases, Appendix II, A. S. T. M. Standard on Petroleum Products and Lubricants, November (1949) page 1313. This proposed method involves complicated temperature control and numerous manipulative steps in making the test.

A testing instrument of this general type has the advantage that the apparent viscosity of the semi-fluid materials is measured in absolute units rather than in arbitrary units. Accordingly, results may readily be related to viscosity measurement of other types of materials and are useful beyond the particular application of checking the uniformity of a given product. Heretofore no satisfactory instrument for control testing of semi-fluid mixtures has been available and we have provided a compact and rugged instrument which is sufficiently accurate to be useful in control testing of semi-fluid greases and the like without resorting to the tedious process and difficultly controlled devices of the prior art.

Referring to the drawings wherein like parts are identified by corresponding reference characters:

Figure 1 is a front elevation partly in section showing the compact arrangement of elements of the device;

Figure 2 is a partial plan view of the apparatus shown in Figure 1;

Figure 3 is an end view of the same apparatus;

Figure 4 is a schematic arrangement of elements;

Figure 5 is a vertical section of the pressure chamber interposed between the capillary tube and the pump outlet as shown in Figure 1; and Figure 6 is a vertical section taken on the center line of the pressure chamber and at right angle to that of Figure 5.

In the drawing, the reservoir 10, comprising a cylindrical container or chamber open at the top, contains the sample to be tested. A delivery tube or conduit 11 is in fluid connection with the bottom of the reservoir 10 and the inlet of pump 12 and supports the reservoir 10 on the pump bracket 13 by means of threaded fitting 14 in threaded bore 15.

A motor 16 is provided which is coupled with a speed reducing unit 17 having a shaft 18 to which is keyed miter gear 19. This gear 19 engages and drives spiral miter gear 20, which in turn rotates the pump shaft 21 within bearing 25. The shaft adaptor 22, which supports gear 20, comprises a disc having a milled slot 24 to receive the end of the drive pin 21 and is secured to the gear 20 by means of set screws 23. Thus the gearing 19—20 drives the pump 12 through pump shaft or drive pin 21.

The pump 12 is a positive displacement pump which is driven at a constant speed by means of the motor 16 and speed reduction unit 17 together with the spiral miter gears 19 and 20. This pump may, for example, be a Zenith pump #1B, type QE, which has a speed of 18 R. P. M. and a capacity of approximately 0.58 cc. per revolution. Typical shear rates and viscosity constants for this type pump are shown in the following table:

TABLE

*Range of shear rate with various capillaries*

| Capillary Number | Shear Rate, Sec.$^{-1}$ | Viscosity Constant, $k$ ($P_1$ in p. s. i.) |
|---|---|---|
| 40-to-1 Series: | | |
| 1 | 31.5 | 13.60 |
| 2 | 130 | 3.21 |
| 3 | 261 | 1.68 |
| 4 | 483 | 0.913 |
| 5 | 1,015 | 0.419 |
| 60-to-1 Series: | | |
| 1 | 33.7 | 7.68 |

These data are merely typical to illustrate the system, and they take into account the exact size calibration of a given set of capillaries 26 and the certified delivery of a particular pump 12 used in our apparatus. The apparent viscosity, N, of the sample is obtained in poises at the shear rate indicated for the capillary being used by multiplying the observed pressure shown by the gauge 27 by the appropriate constant $k$ for the capillary 26.

The outlet 28 of the pump 12 is in fluid-tight connection with the bevelled end 31 of the adaptor or trunnion 30. External threads 32 engage the threaded bore 33 in the pump bracket 13 and the non-circular wrench-engaging surface 34 provides means for drawing the adaptor 30 into pressure-tight contact with the pump outlet. The adaptor 30 is externally threaded adjacent the outlet end 35 for connection to the diaphragm gauge pressure system 36.

The capillary tube 26 as shown in the drawings includes the externally threaded inlet end 37 for engagement with the outlet of the diaphragm assembly 36. The capillaries normally used are those specified in the aforementioned A. S. T. M. Proposed Method of Test for Apparent Viscosity of Lubricating Greases. The length to diameter ratio is ordinarily 40:1, although for some types of semi-fluids, a length to diameter ratio of 60:1 can be used. The capillaries 26 are commercially available in a set of eight. The capillary most generally employed for semi-fluid greases is #1 of this set.

It is desirable that the capillary 26 be maintained level during testing and the leveling screw 38 acting through leg 39 on the vertical mounting plate 40 is provided for adjusting the device each time it is set up at the point of testing. One end or edge of the plate 40 is fixed to the housing 41 of the speed reducer 17. Thus the plate 40 extends laterally from the housing and the screw 38 supports the free end of the plate.

In Figure 4, we have illustrated in a simplified manner a schematic view of the essential elements illustrated in the compact apparatus shown in Figures 1, 2 and 3. The receptacle or reservoir 10 has its outlet connected to the inlet side of the pump 12 by means of conduit 11. The motor 16 drives the pump 12 through the speed reducer assembly 17. The adaptor 30 is threaded to the outlet of the positive displacement pump 12 which is operated at a constant speed by the motor 16, speed reducer 17, and the gear assembly 19—20. Pressure gauge 27 is connected by fluid conduit 45 to the pressure diaphragm chamber 36, and capillary tube 26 is fixed to the outlet of the diaphragm gauge pressure system.

We have illustrated in Figure 5 et seq. the details of the diaphragm gauge pressure system 36 including a pressure gauge 27 connected by conduit 45 to the upper flanged member 46 of the diaphragm assembly. A diaphragm 47 is interposed between the upper flanged member 46 and a lower flanged member 48. The lower flanged member 48 includes a diametrical rib 49 provided with a channel 50 terminating in threaded openings 51 and 52. The channel 50 is in communication with the enlarged cavity 53, in which the semi-fluid grease is maintained in pressure contact with the diaphragm 47. The upper flange 46 is provided with a corresponding cavity 54 and the diaphragm 47 is adapted to be deflected upwardly into cavity 54 in response to the pressure exerted by the grease in the pressure chamber 53.

Although we have shown a fluid-operated gauge 27, it is also contemplated that the diaphragm 47 may be used to actuate an electrical indicating system. Thus the deflection of the diaphragm 47 may be used to move a solenoid within a tuned or balanced circuit.

A U-shaped bracket 55 held in place by two screws 56 on the diametrical enlargement 49 supports the diaphragm assembly. Vertically adjustable leg 57 is disposed below the U-shaped bracket 55 and is provided with adjusting lock nut 58. Thus the flange support 55 is adjustable with the levelling screw 38, which supports the frame 40 of the pump assembly.

In the operation of the viscometer illustrated by the drawings, the sample under test is poured into the reservoir 10 and drawn down by the pump 12 through inlet conduit 11 and forced through the adaptor 30 into diaphragm pressure chamber 36 and through the capillary tube 26. Equilibrium conditions are rapidly attained and then the pressure is read from the sensitive gauge 27. The pump 12 is operated at constant speed and the pressure drop due to the restricted flow area of the capillary 26 is a function of the apparent viscosity of the sample. This can be calculated from Poiseulle's equation:

(A) $\quad$ Apparent viscosity, $N = \dfrac{\text{shearing force}}{\text{shearing rate}} = \dfrac{\frac{PR}{2L}}{\frac{4v/t}{\pi R^3}}$ where $P$ = pressure in dynes per square centimeter
$R$ = radius of the capillary in centimeters
$L$ = length of capillary in centimeters
$v/t$ = flow rate in cc. per second For a given capillary 26 and at a constant flow rate by a pump 12, (B) $\quad$ Apparent viscosity, $N = kP_1$ where $P_1$ = pressure indicated by gauge 27
$k$ = a constant (that includes all of the fixed factors in Equation A as well as the conversion factors applicable to the units of pressure measurement).

It will be appreciated that the output of the pump 12, the dimensions of the capillary 26 and the range of the gauge 27 will determine the range of any given instrument. Therefore, these factors must be adapted to the shear rate at which the greases are to be tested and to the range of greases that will flow into the pump 12. By "shear rate" we refer to that described in a summary report project CLLG-20-43, Coordinating Research Council, Inc. and Technical Committee, National Lubricating Grease Institute (1946). A high shear rate represents the oil viscosity rather than the consistency of the grease and it is therefore desirable to select a flow rate which is as low as practical. Furthermore, for routine use it is desirable to employ a single capillary.

With a pump speed of about 18 R. P. M. and a pump capacity of about 0.58 cc. per revolution a range of about 2 to about 400 poises at 30 reciprocal seconds is provided by our apparatus. Thus, the range of the instrument extends beyond the semi-fluid range into the NLGI #1 classification of greases and is also useful in determining the apparent viscosity of thixotropic gelled hydrocarbons such as prepared from gasoline and containing between about 3 and 5 wt. per cent of a Napalm soap.

Reproducibility of the values obtained on particular grease samples is excellent. In tests equilibrium pressure is obtained within two or three minutes but each test may be allowed to run about five minutes before the pressure reading is taken, which represents a flow of about 50 cc. of grease from reservoir 10 through capillary 26.

In the operation of the device, the sample reservoir 10 and the capillary 26 may be cleaned with a suitable solvent, but cleaning is not necessary between tests on many semi-fluid products. No appreciable errors have been detected when the first grease is pumped out completely and the following sample is used to flush the instrument.

The elements of our device are in compact relations, and a durable and easily portable apparatus has been provided. Furthermore, the compact arrangement of the elements makes unnecessary any constant temperature bath and the like which have heretofore been used in an attempt to compensate for ambient temperature changes. As illustrated in the table, once the constant $k$ for the specific device has been determined, the results are easily and readily reproducible.

From the above it is apparent that we have attained the objects of our invention and have provided a new simplified pressure viscometer which is convenient to use and accurate in its measurements. Such a device is particularly adapted for the rapid routine testing of semi-fluid products.

Although specific embodiments of our invention have been described, it should be understood that these are by way of illustration only and that the invention is not limited thereto since alternative embodiments and operating techniques will become apparent to those skilled in the art in view of our disclosure. Accordingly, modifications of our invention are contemplated without departing from the spirit of our described invention or the scope of the appended claims.

What we claim is:

1. In combination, a mounting plate adapted to be disposed in a vertical plane, a U-shaped member fixed at its base to said mounting plate, there being aligned threaded bores in the arms of said U-shaped member, a drive means bolted to said mounting plate, said drive means being provided with a substantial base which also supports the said mounting plate, a threaded fitting extending within the first of said threaded bores, an elbow fixed to one end of said fitting, a cylindrical open-topped container, said elbow being fixed to the lower end of said container and acting as a support therefor, a pressure assembly supported laterally of said U-shaped member and comprising a pair of flanged concave discs with a diaphragm between the flanges to provide a pair of cavities, a threaded inlet and a threaded outlet to the first of said cavities, a straight open-topped channel extending between said inlet and said outlet across the lower of said flanged concave discs, a constant volume pump fixed between the arms of said U-shaped member and having its inlet end in fluid connection with said first fitting and its outlet in fluid connection with the inlet of said first cavity, a capillary extending substantially horizontally from the outlet of said first cavity, said capillary comprising the terminal of the flow path through the apparatus, a pressure gauge in communication with the second cavity, and an adjustable leg and yoke depending from said pressure assembly whereby the said capillary tube can be horizontally disposed.

2. In combination a drive means, a mounting plate supported at one end by said drive means and disposed in a vertical plane, a U-shaped member fixed at its base to said mounting plate and having the arm portions of said member extending normal to said plate and in a substantially horizontal plane, there being aligned threaded bores in the outer ends of the arms of said U-shaped member, a threaded fitting extending within each of said threaded bores, a pump arranged between said arms with the inlet in communication with one of said fittings and the outlet in communication with the other of said fittings, an elbow fixed to one of said fittings, an open-topped reservoir having a bottom outlet, said elbow being fixed to said bottom outlet and acting as a support for said reservoir, a pressure-measuring assembly fixed to said outlet fitting and extending laterally from an arm portion of said U-shaped member, an adjustable end support for said plate, said adjustable end support comprising a depending leg member integral with said plate and an adjustable foot threaded axially of said depending leg portion, a capillary tube extending substantially horizontally from the outlet of said pressure-measuring assembly, said capillary tube comprising the terminal of the path of flow through the device, and an adjustable leg and yoke support below said pressure assembly, said yoke engaging the underside of said assembly and said adjustable leg comprising a depending post which is adjustably threaded into said yoke, whereby the said capillary tube is horizontally disposed.

3. The apparatus of claim 2 wherein the pressure-measuring assembly comprises a pair of flanged concave discs, a diaphragm mounted between the flanges to provide a lower cavity and an upper cavity between said discs, a diametrical rib on the exterior of the lower flanged disc and extending between said threaded inlet and outlet, a yoke member adjustably engaging said rib, an adjustable post threaded to said yoke and providing a leveling support for said assembly, a flow channel within said rib exposed along its entire length to the lower cavity in said assembly, a threaded inlet and a threaded outlet aligned with the ends of said flow channel, a drilled and tapped bore in the center of the upper disc, a pressure-transmitting fluid within said upper cavity, and a fluid pressure-sensitive indicator means in communication with said threaded bore.

References Cited in the file of this patent

UNITED STATES PATENTS

| Number | Name | Date |
|---|---|---|
| 1,604,672 | Albershiem et al. | Oct. 26, 1926 |
| 1,654,614 | Smith | Jan. 3, 1928 |
| 1,669,460 | Galdi et al. | May 15, 1928 |
| 2,459,483 | Zimmer et al. | Jan. 18, 1949 |

FOREIGN PATENTS

| Number | Country | Date |
|---|---|---|
| 916,664 | France | Aug. 26, 1946 |